US012110838B2

(12) United States Patent
Shi et al.

(10) Patent No.: US 12,110,838 B2
(45) Date of Patent: Oct. 8, 2024

(54) COVER FOR AUTOMOBILE ENGINE

(71) Applicant: Sumitomo Riko Company Limited, Aichi (JP)

(72) Inventors: Yuan Shi, Osaka (JP); Daiki Mokude, Aichi (JP); Koji Tomiyama, Aichi (JP); Koki Kaneda, Aichi (JP); Kazuyoshi Onishi, Aichi (JP); Hiroki Taguchi, Aichi (JP); Yasuo Suzuki, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 18/581,347

(22) Filed: Feb. 19, 2024

(65) Prior Publication Data

US 2024/0191671 A1 Jun. 13, 2024

Related U.S. Application Data

(63) Continuation of application No. PCT/JP2022/036108, filed on Sep. 28, 2022.

(30) Foreign Application Priority Data

Oct. 4, 2021 (JP) ................................. 2021-163505

(51) Int. Cl.
*F02F 7/00* (2006.01)
*B60K 5/12* (2006.01)
*B60K 5/04* (2006.01)

(52) U.S. Cl.
CPC ............ *F02F 7/008* (2013.01); *B60K 5/1241* (2013.01); *B60K 5/04* (2013.01); *F02F 2007/0041* (2013.01); *F02F 2007/0078* (2013.01); *F02F 7/0085* (2013.01)

(58) Field of Classification Search
CPC .. F02F 7/008; F02F 7/0085; F02F 2007/0041; F02F 2007/0078; B60K 5/1241; B60K 5/04

See application file for complete search history.

(56) References Cited

FOREIGN PATENT DOCUMENTS

| JP | S5812638 | 1/1983 |
|---|---|---|
| JP | H03121988 | 12/1991 |
| JP | H0434436 | 3/1992 |
| JP | H0475132 | 6/1992 |
| JP | H10319968 | 12/1998 |
| JP | H11254570 | 9/1999 |
| JP | 2000025536 | 1/2000 |
| JP | 2001098954 | 4/2001 |
| JP | 6218557 | 10/2017 |

OTHER PUBLICATIONS

"Written Opinion of the International Searching Authority (Form PCT/ISA/237) of PCT/JP2022/036108", mailed on Nov. 22, 2022, with English translation thereof, pp. 1-8.

(Continued)

*Primary Examiner* — Xiao En Mo
(74) *Attorney, Agent, or Firm* — JCIPRNET (57) ABSTRACT

A cover for an automobile engine covers a crank pulley and an auxiliary drive belt of an engine arranged in an engine room with the crank pulley and the auxiliary drive belt being in a posture facing a front direction of a vehicle body. The cover includes a reinforcing body that includes a fastening part attaching to the engine and is integrated with a sound-absorbing main body.

4 Claims, 6 Drawing Sheets

(56) References Cited

OTHER PUBLICATIONS

"International Search Report (Form PCT/ISA/210) of PCT/JP2022/036108", mailed on Nov. 22, 2022, with English translation thereof, pp. 1-6.
"Notice of Reasons for Refusal of Japan Counterpart Application", issued on Sep. 27, 2023, with translation thereof, pp. 1-5.

COVER FOR AUTOMOBILE ENGINE

CROSS-REFERENCE TO RELATED APPLICATION

The present application is a continuation of PCT/JP2022/036108, filed on Sep. 28, 2022, and is related to and claims priority from Japanese patent application no. 2021-163505, filed on Oct. 4, 2021. The entire contents of the aforementioned application are hereby incorporated by reference herein.

TECHNICAL FIELD

The disclosure relates to a cover for an automobile engine.

RELATED ART

The engine of an automobile is generally arranged in an engine room provided at a front part of a vehicle body. There are various forms of the engine room. In the case of a sedan-type automobile, the engine room is formed in front of the driver's seat and is covered with a hood (bonnet). In the case of a cab-over type or one-box type automobile, the engine room may extend to below the cabin.

Furthermore, regarding the arrangement posture of the engine, there are a transverse type in which the crankshaft is arranged in a posture that is long in the vehicle width direction, and a longitudinal type in which the crankshaft is arranged in a posture that is long in the front-rear direction of the vehicle body. In the case of a cab-over type or one-box type automobile, due to the limited space in the height direction, the cylinder bore of the engine is greatly slanted in a posture closer to horizontal than vertical.

In any case, since the bottom of the engine room is largely opened, foreign objects such as pebbles splashed by the front wheels may fly toward the engine during travel of the automobile. In longitudinal engines, because the crank pulley and the auxiliary drive belt face the forward direction of the automobile, foreign objects are likely to hit the crank pulley and the auxiliary drive belt. Also, noise generated around the engine during travel may leak from the floor opening of the engine room and propagate as external noise. This issue of external noise is particularly prominent in cab-over type or one-box type automobiles as the engine mounting position is low. Thus, covers have been proposed for protecting the engine and preventing noise.

As examples, Patent Document 1 (Japanese Patent No. 6218557) and Patent Document 2 (Microfilm of Japanese Utility Model Publication No. H3-121988) disclose providing an undercover that entirely covers an engine from below, targeting a slant engine arranged longitudinally in a cab-over type automobile. Patent Document 3 (Microfilm of Japanese Utility Model Publication No. H4-075132) discloses providing a cover to prevent foreign objects from getting caught between the auxiliary drive belt and the crank pulley, similarly targeting a slant engine arranged longitudinally.

In engines, the timing chain driving a cam is covered with a chain cover, and as a noise reduction means, a sound-absorbing material may also be attached to the chain cover.

When an undercover is provided as in Patent Document 1 and Patent Document 2, the undercover is excellent in effects such as suppressing noise generated around the engine from leaking outside the vehicle and preventing water splashing and collision with foreign objects for members such as the crank pulley and the auxiliary drive belt. However, if these effects are pursued and the setting range of the undercover is expanded, there will be issues of weight increase as well as heat damage to engine parts due to hindered ventilation of the engine room. On the other hand, since Patent Document 3 only provides partial protection, the protective function is insufficient, and there is also an issue that no noise suppression function can be expected at all.

Furthermore, as mentioned above, a sound-absorbing material may also be attached to the chain cover to provide a noise shielding function, but in that case, the sound generated by the rotation of the crank pulley and the revolution of the auxiliary drive belt cannot be prevented from leaking outside the vehicle, so there is an issue that a high noise shielding function cannot be expected. In this respect, it is conceivable to cover the crank pulley and the auxiliary drive belt with a sound-absorbing cover, but sound-absorbing materials generally have a lower density and a smaller strength than metals, so there is a risk that sufficient rigidity and shape retention cannot be maintained.

SUMMARY

An embodiment of the disclosure (first aspect) relates to a cover that covers a crank pulley and an auxiliary drive belt of an engine arranged in an engine room with the crank pulley and the auxiliary drive belt being in a posture facing a front direction of a vehicle body. The cover includes a feature "a reinforcing body including a fastening part attaching to the engine is integrated with a sound-absorbing main body". For example, a method of insert molding the sound-absorbing main body to the reinforcing body may be adopted as an integrating means.

The cover of an embodiment of the disclosure is a composite structure of the sound-absorbing main body and the reinforcing body. The reinforcing body may be formed in a form different from the sound-absorbing main body, or may be formed in a form substantially the same as the sound-absorbing main body. In terms of the form, it is also possible to select a lattice shape or a punching metal shape. Also, the reinforcing body may be in various arrangement configurations, such as a configuration of being exposed on one surface of the sound-absorbing main body or a configuration of being exposed on both surfaces.

The disclosure may be expanded in various forms. As an example, claim 2 (second aspect) adopts a configuration "the fastening part is provided with a collar in a cylindrical shape, the collar receiving a pressing force of a bolt or another rod-shaped fastener and penetrating through the reinforcing body".

Furthermore, according to claim 3 (third aspect), in claim 1 or 2, the cover has a configuration "the sound-absorbing main body forms a tray shape that is opened toward the engine as a whole and is composed of hard urethane with a thickness of several millimeters to less than 20 millimeters (e.g., 5 mm to 15 mm), and the reinforcing body is formed in a cross shape as a whole including a longitudinally-long part that is long in a cylinder bore axis direction as viewed from a crank axis direction and a laterally-long part that is long in a direction crossing the cylinder bore axis direction as viewed from the crank axis direction, and the fastening part is provided at both ends of the longitudinally-long part and both ends of the laterally-long part of the reinforcing body".

The "hard urethane (hard polyurethane)" described in claim 3 refers to a urethane resin with a cross-linked structure, which maintains the tray shape by itself and has a strength that does not bend with a light force even when pushed by a person with his or her hands.

Furthermore, according to claim 4 (fourth aspect), in claim 1 or 2, the cover has a configuration "the sound-absorbing main body forms a tray shape that is opened toward the engine as a whole with an outer circumferential part serving as a wall part, and the reinforcing body is also arranged at the wall part of the sound-absorbing main body". In this case, a flange-shaped fastening part to be overlapped with the engine may be provided at a part of the reinforcing body that is arranged at the wall part.

The cover of an embodiment of the disclosure is applied to a longitudinal engine in which the crank pulley and the auxiliary drive belt are arranged facing the front side of the vehicle body. However, since the pulley, the auxiliary drive belt, etc. are covered from the front side by the cover, it is possible to properly protect members such as pulleys and auxiliary drive belts from foreign objects (e.g., pebbles splashed up by wheels), rain, or snow.

Furthermore, because the cover includes the sound-absorbing main body, the cover can suppress noise generated by rotation of the pulley and revolution of the auxiliary drive belt from leaking outside the engine room to improve quietness both inside and outside the vehicle. Additionally, because the cover has high heat insulation properties, there is also an advantage that it can suppress cooling of the engine during travel in low temperature environments. As the cover is exposed to wind during travel, heat build-up does not occur.

Since sound-absorbing materials generally have a lower strength compared to metal plates or hard synthetic resins, when the cover is fastened to the engine with fasteners such as bolts, if the sound-absorbing main body is directly pressed by fasteners such as bolts, stress concentrates on (the peripheral part of) the fastening part and thus makes the spot of the fastening part prone to breakage due to a load resulting from vibration or the like. To address this, one may consider securing multiple fastening parts to reduce the load acting on one fastening part. However, this approach not only requires a lot of effort in fastening work but also makes the design of the cover and the engine very complicated to secure the fastening spots and is thus not practical.

In contrast, in an embodiment of the disclosure, since the fastening part for fastening to the engine is formed on the reinforcing body, it is possible to prevent the pressing force associated with fastening of the fastener from spreading to the sound-absorbing material. Thus, it is possible to prevent stress from concentrating at narrow parts of the sound-absorbing main body and to firmly fix the cover to the engine even by fastening at a few spots. Accordingly, in an embodiment of the disclosure, high attaching strength can be ensured while securing the protection function and the noise shielding function provided by the cover.

As in claim 2, it is possible to provide a collar at the fastening part to secure a high attaching strength while spreading the sound-absorbing main body to the spot of the fastening part. In this case, if a washer part is provided at the collar and the washer part is overlapped with the engine, the support area provided by the engine can be increased to improve the fastening strength, and the joint area between the reinforcing member and the sound-absorbing member can be increased to improve the integration between the reinforcing member and the sound-absorbing member, so there is also an advantage of contributing to improving the robustness of the cover.

According to the configuration of claim 3, the cover has a tray shape and has high resistance to bending and twisting, and, in addition, the reinforcing body is formed in a cross shape and can uniformly reinforce the sound-absorbing part composed of hard urethane. Thus, it is possible to stably and firmly support the cover even by fastening at only four spots.

As in claim 4, if the reinforcing body is also arranged at the wall part of the sound-absorbing main body, the rib effect created by forming the cover in a tray state can be further improved, so the strength against twisting and bending can be further improved.

BRIEF DESCRIPTION OF DRAWINGS

(A) of FIG. 4 is a front view of the cover, and (B) of FIG. 4 is a bottom view along line B-B in (A) of FIG. 4.

(A) of FIG. 5 is a side view along line VA-VA in (A) of FIG. 4, (B) of FIG. 5 is a cross-sectional view along line VB-VB in (A) of FIG. 4, and (C) of FIG. 5 is a cross-sectional view along line VC-VC in (A) of FIG. 4.

DESCRIPTION OF EMBODIMENTS

Embodiments of the disclosure relate to a cover capable of preventing water splashing and foreign object biting into members such as a crank pulley and an auxiliary drive belt and is excellent in noise shielding, and disclose a technique that improves properties such as low heat deformation temperature while being excellent in shape retention (rigidity).

Next, embodiments of the disclosure will be described based on the drawings. In the following, the terms "front", "rear", "left", and "right" are used to specify directions, where a front-rear direction is a crank axis direction and a front-rear direction of a vehicle, and a left-right direction is a vehicle width direction. Thus, the front, rear, left, and right directions are the same directions as viewed by the driver. An up-down direction is taken as a vertical direction. The directions are labeled in FIG. 1 and FIG. 2. T stands for top, B stands for bottom, R stands for right, and L stands for left.

(1). Overview of Engine

Figure 1:
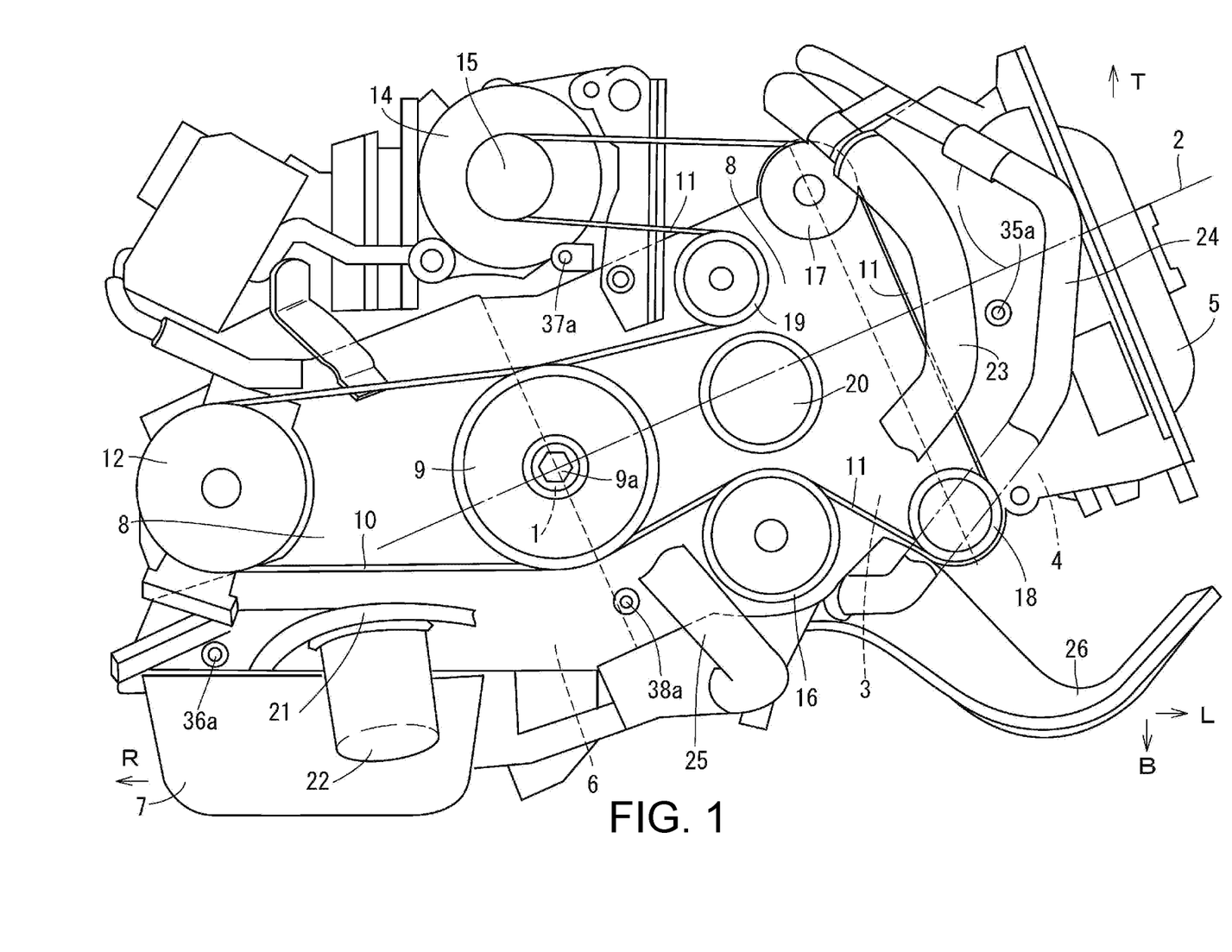
FIG. 1 is a front view of an engine to which a cover according to an embodiment is applied.

First, an engine to which a cover of this embodiment is applied will be described based on FIG. 1. The engine is mounted in a one-box cab-over type automobile, and a crankshaft 1 is mounted in an engine room in a longitudinal posture facing the front-rear direction. Further, a cylinder bore axis 2 is greatly slanted to a state close to being horizontal. The slant angle is about 25 degrees with respect to the horizontal direction.

The engine includes a cylinder block 3, which is a main part of the engine body, and a cylinder head 4 fixed to the top surface of the cylinder block 3, with a head cover 5 fixed to the top surface of the cylinder head 4. On the other hand, an upper oil pan 6, which also functions as a crankcase, is fixed to the bottom surface of the cylinder block 3, and a lower oil pan 7 is fixed to the lower surface of the upper oil pan 6. One chain cover 8 covering a timing chain (not shown) is arranged at the front surfaces of the cylinder head 4, the cylinder block 3, and the upper oil pan 6, and the chain cover 8 is fixed to the cylinder head 4, the cylinder block 3, and the upper oil pan 6 by a group of bolts.

The front end of the crankshaft 1 protrudes to the front side of the chain cover 8, and a crank pulley 9 is fixed to this protruding front end by a bolt 9a. Two auxiliary drive belts, i.e., a first auxiliary drive belt 10 and a second auxiliary drive belt 11, are wound around the crank pulley 9. The first auxiliary drive belt 10 is wound around a pulley 12 of an air conditioning compressor arranged on the right side of the upper oil pan 6. The second auxiliary drive belt 11 is wound by its front surface around a pulley 15 of an alternator 14 arranged above the crank pulley 9 and is wound by its back surface around a pulley 16 of a water pump arranged at a position lower than the crankshaft 1.

The second auxiliary drive belt 11 is greatly meandering toward the side of the cylinder head 4 to increase a contact length with the pulley 15 of the alternator 14, and the meandering state is maintained by a pair of upper and lower idle pulleys 17 and 18 of a front surface winding type arranged at locations close to the cylinder head 4 and a tension pulley 19 of a back surface winding type arranged to the left of the pulley 15 of the alternator.

The tension pulley 19 is an auto tensioner and is attached via an arm (not shown) to a rotating body arranged below the tension pulley 19. The rotating body 20 includes a spring built therein that imparts resistance to its rotation, and the tension pulley 19, which is movable in the left-right direction, pushes the second auxiliary drive belt 11 to the left direction.

A forward projecting part 21 is formed at a part of the chain cover 8 above the lower oil pan 7, and an oil filter 22 is screwed onto the forward projecting part 21 from below. In FIG. 1, reference signs 23, 24, and 25 represent cooling system hoses, and reference sign 26 represents one of mount brackets for supporting the engine on a vehicle body.

(2). Basic Structure of Cover

Figure 2:
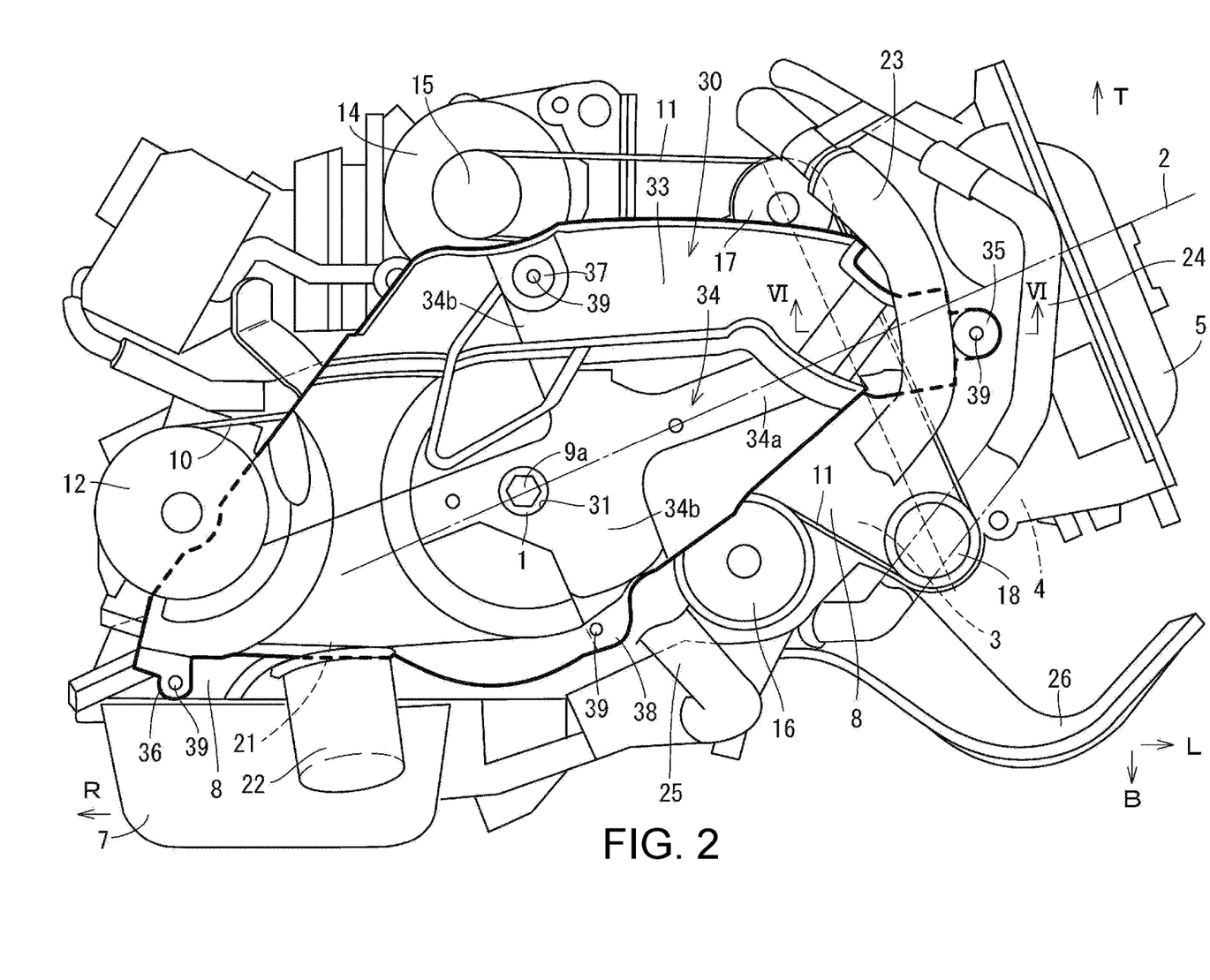
FIG. 2 is a front view of the engine with the cover mounted.

As shown in FIG. 2, a cover (front cover) 30 is arranged at a front surface part of the engine, and the cover 30 covers the entirety of the crank pulley 9, most of the first auxiliary drive belt 10, and about the lower half of the second auxiliary drive belt 11. The cover 30 has a substantially diamond shape elongated in the direction of the cylinder bore axis 2, and a through hole 31 that exposes the bolt 9a fixing the crank pulley 9 to the crankshaft 1 is formed at a part slightly to the right from the center.

Figure 3:
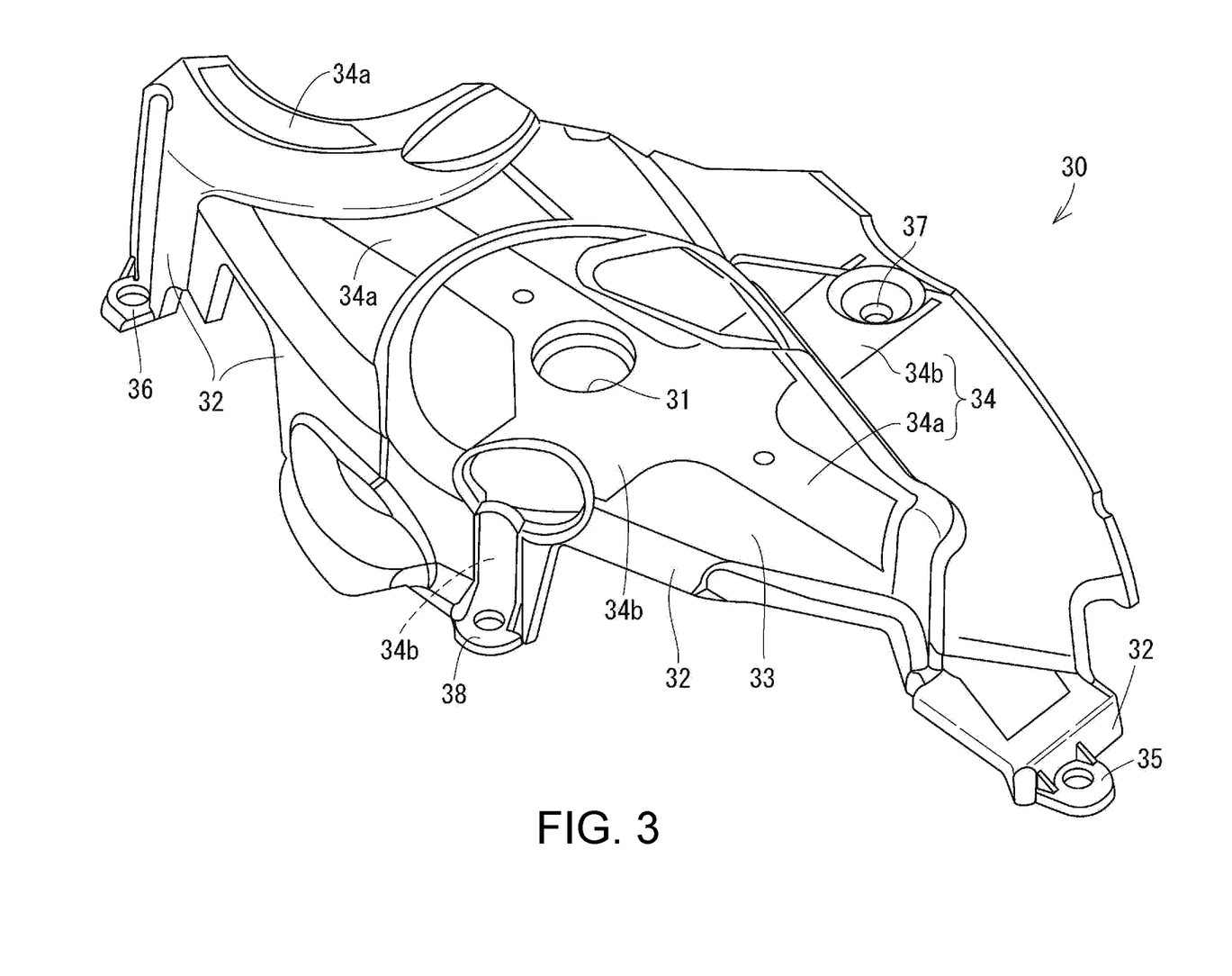
FIG. 3 is a perspective view of the cover.
Figure 4:
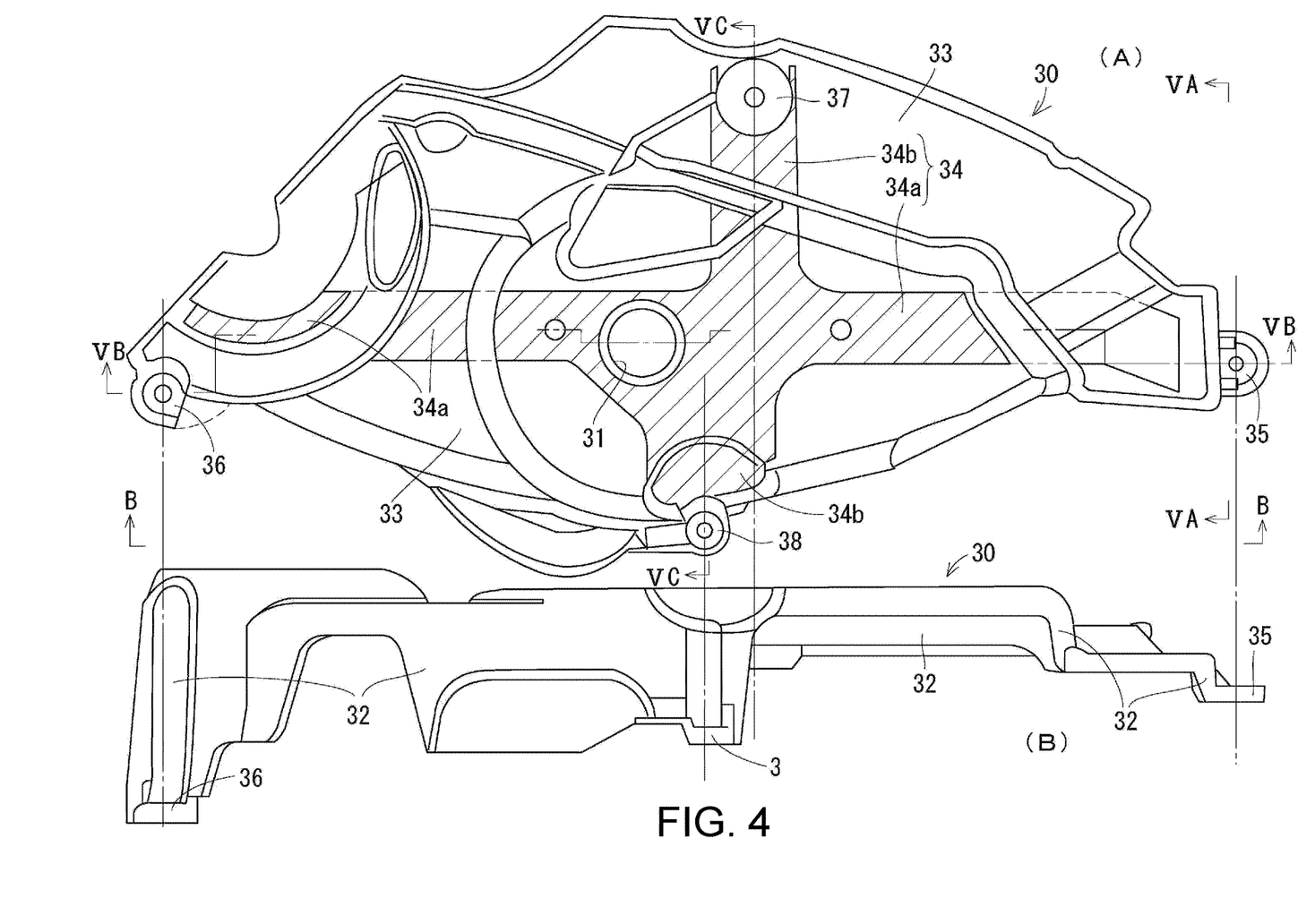
Figure 5:
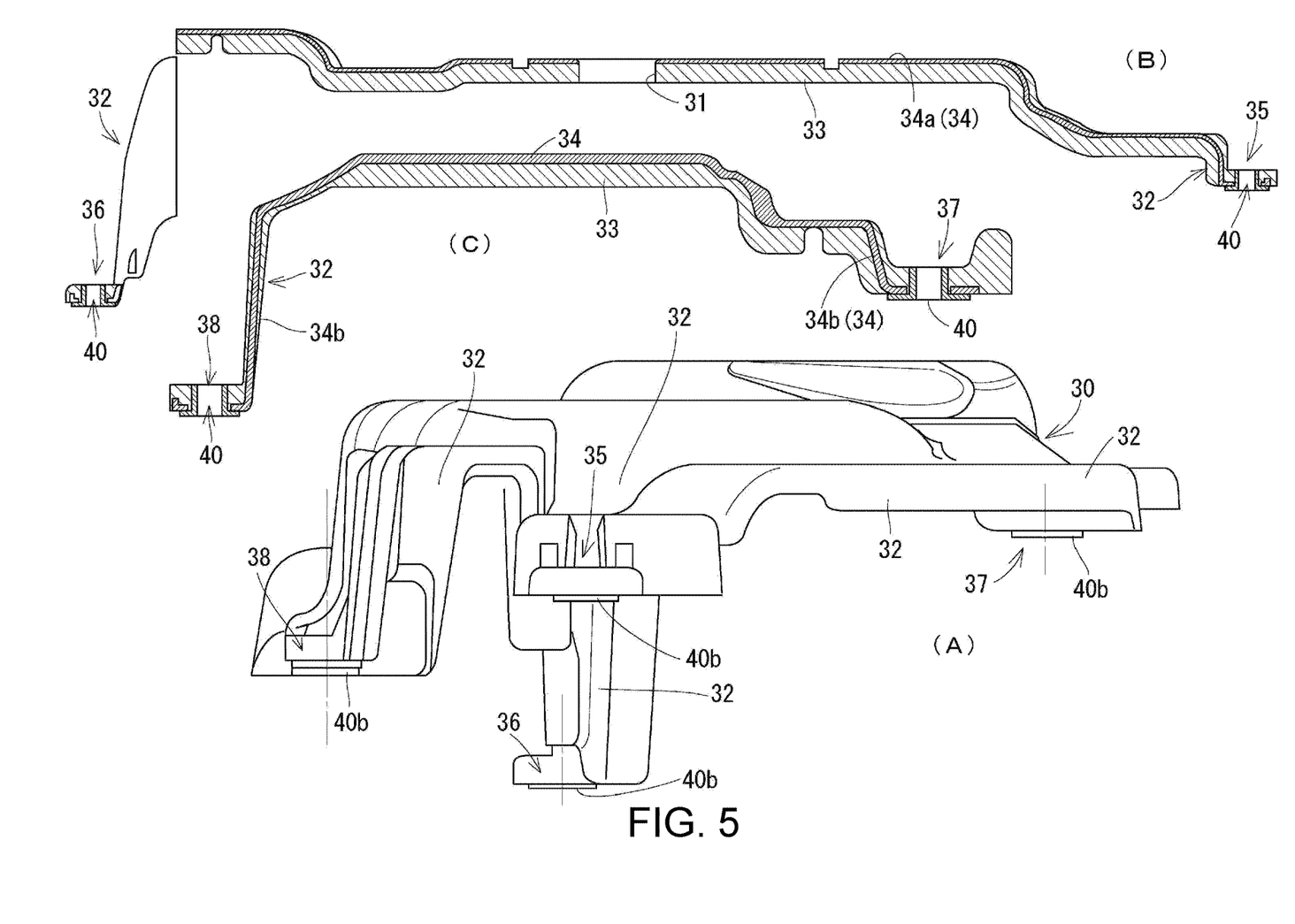

As can be learned from FIG. 3 to FIG. 5, the cover 30 is formed in a tray shape that is opened toward the chain cover 8 with a wall part 32 around the cover 30. Further, the cover 30 has a complex convexo-concave shape so as not to interfere with the crank pulley 9, the water pump, etc. Furthermore, as can be learned from (B) and (C) of FIG. 5, the cover 30 includes a thick-walled sound-absorbing main body 33 and a reinforcing body 34 that is integrally formed with the sound-absorbing main body 33 by insert molding.

The sound-absorbing main body 33 constitutes the outer shape of the cover 30 and is a molded product of hard urethane resin. On the other hand, the reinforcing body 34 is a molded product of synthetic resin such as nylon resin, polypropylene resin, polycarbonate resin, high-density polyethylene resin, etc., and is formed in a plate shape. Thus, after manufacturing the reinforcing body 34 first, the reinforcing body 34 is set in a mold to mold the sound-absorbing main body 33. The sound-absorbing main body 33 maintains its shape even without the reinforcing body 34 and has a strength to the extent that it does not deform even if a person applies some force by hand.

Most of the reinforcing body 34 is joined to the outer surface (mainly the front surface) of the sound-absorbing main body 33, but a part of the reinforcing body 34 is joined to the inner surface (mainly the rear surface) of the sound-absorbing main body 33. Thus, there are portions of the reinforcing body 34 that are not exposed. In FIG. 4, parallel oblique lines are applied to the portion where the reinforcing body 34 is exposed. The sound-absorbing main body 33 is set to a thickness of about 10 mm, but its thickness may also be set in any manner (e.g., about 5 mm to 20 mm). It is also possible to vary the thickness depending on the position. The thickness of the reinforcing body 34 is about 2 mm, but it may also be set in any manner. It is also possible to manufacture the reinforcing body 34 with a metal plate.

As can be clearly learned from FIG. 2, the reinforcing body 34 includes a longitudinally-long part 34a that is long in the direction of the cylinder bore axis 2 and a laterally-long part 34b that crosses the longitudinally-long part 34a, and the reinforcing body 34 forms a cross shape as a whole. The longitudinally-long part 34a extends in approximately a straight line, and upper and lower portions of the laterally-long part 34b that straddle the longitudinally-long part 34a are shifted in the left-right direction.

Similar to the front surface part, the wall part 32 constituting the outer circumferential part of the cover 30 is composed of both the sound-absorbing main body 33 and the reinforcing body 34. First to fourth fastening parts 35 to 38 for fixing the cover 30 to the chain cover 8 are formed at the wall part 32 located at both ends of the longitudinally-long part 34a and the wall part 32 located at both ends of the laterally-long part 34b.

The fastening parts 35 to 38 are provided at rearward parts (wall part 32) protruding in the shape of a foot, but their rearward protruding dimensions differ from each other. That is, as can be learned from FIG. 4 and FIG. 5, the first fastening part 35 located on the side of the cylinder head 4 at the upper right end of the longitudinally-long part 34a has a second smallest (third largest) protruding height; the second fastening part 36 located at a part close to the lower oil pan 7 at the lower end of the longitudinally-long part 34a has a largest protruding height; the third fastening part 37 located at a part close to the alternator 14 at the upper end of the laterally-long part 34b has a smallest protruding height; and the fourth fastening part 38 located almost below the crank pulley 9 at the lower end of the laterally-long part 34b has a second largest protruding height. Such differences in the protruding height (front-rear position) of each of the fastening parts 35 to 38 are due to differences in the shape of the front surface of the chain cover 8.

As shown in FIG. 2, a part of the right side part of the cover 30 is hidden behind the pulley 12 of the air conditioner compressor. Thus, a part of the wall part 32 of the cover 30 that is close to the pulley 12 of the air conditioner compressor is notched so as not to interfere with the first auxiliary drive belt 10. The lower part of the pulley 15 of the alternator 14 is partially covered by the cover 30.

(3). Structure of Fastening Parts

The fastening parts 35 to 38 basically has the same structure. Thus, in FIG. 6, the first fastening part 35 is specifically illustrated as an example. That is, each of the fastening parts 35 to 38 is formed in a flange shape at the edge of the reinforcing body 34 and the edge part of the sound-absorbing main body 33, and is fastened to the chain cover 8 with a bolt 39. A reinforcing member 40 that supports the axial force of the bolt 39 is mounted to the reinforcing body 34 and the sound-absorbing main body 33.

Figure 6:
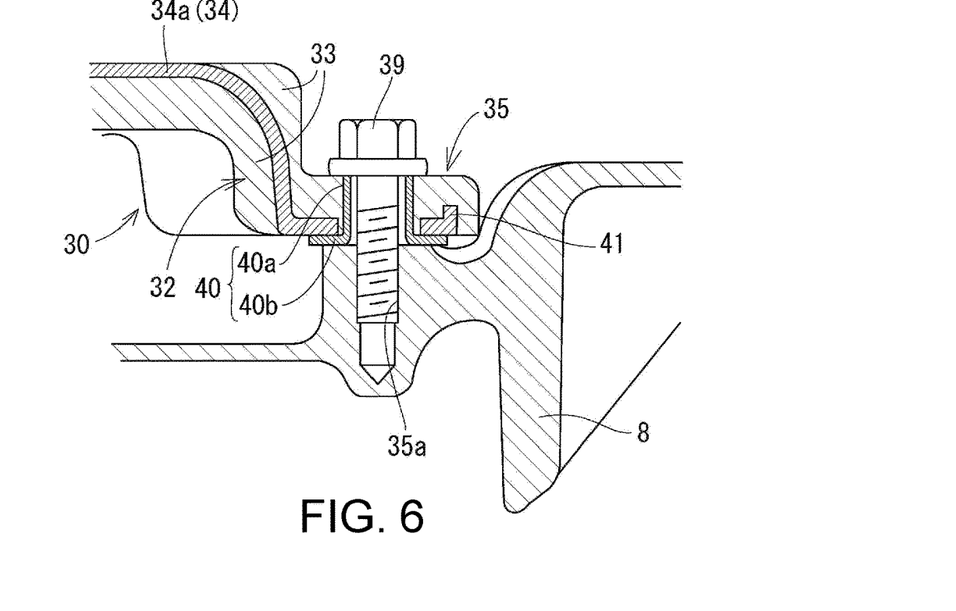
FIG. 6 is an enlarged cross-sectional view along line VI-VI in FIG. 2.

At each of the fastening parts 35 to 38, a rib 41 for improving rigidity is provided at the outer circumference of the reinforcing body 34, and the rib 41 is embedded in the sound-absorbing main body 33. In FIG. 2, bolts are schematically represented by circles. As shown in FIG. 6, tapped holes 35a to 38a (also see FIG. 1) into which the bolts 39 are screwed are formed at the spots of each of the fastening parts 35 to 38 on the chain cover 8.

The reinforcing member 40 is made of a metal plate or a hard synthetic resin, and includes a collar 40a through which a shaft part of the bolt 39 passes, and a washer part 40b that overlaps with the chain cover 8. The reinforcing member 40 is formed in a T-shape as a whole. In the embodiment, the reinforcing body 34 is set in the mold with the reinforcing member 40 adhered to the reinforcing body 34 to mold the sound-absorbing main body 33, so the sound-absorbing main body 33 is also joined to the reinforcing member 40 by insert molding, but the reinforcing member 40 may also be set to the cover 30 when attaching the cover 30.

Alternatively, after manufacturing the sound-absorbing main body 33, it is also possible to forcibly mount the reinforcing member 40 by the elastic deformation of the sound-absorbing main body 33 and/or the reinforcing body 34, or to adhere the washer part 40b with an adhesive.

Figure 7:
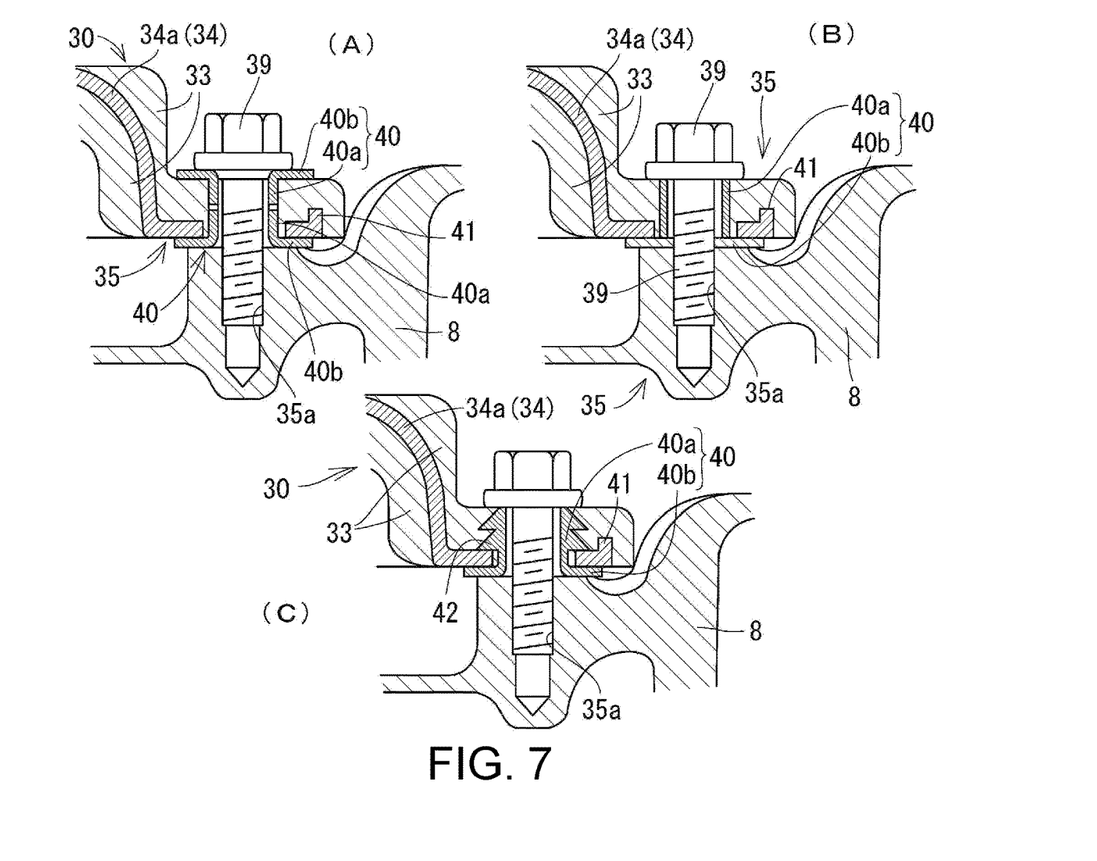
FIG. 7 is a cross-sectional view showing other embodiments at the same spot as FIG. 6.

The reinforcing member 40 may be embodied in various forms. Examples thereof are shown in FIG. 7. In the example shown in (A) of FIG. 7, the reinforcing member 40 is composed of two members separated in the axial direction of the bolt 39. Both members have a collar 40a and a washer part 40b. The two members have the same form.

In the embodiment shown in (B) of FIG. 7, the collar 40a and the washer part 40b are formed as separate members and are joined together by an adhesive or the like. The collar 40a abuts against an inner circumferential part of the washer part 40b. Thus, an external force in the axial direction acting on the collar 40a is supported by the chain cover 8 via the washer part 40b.

In the embodiment shown in (C) of FIG. 7, the reinforcing member 40 is made of a hard synthetic resin, an annular engaging protrusion 42 in a mountain shape is integrally formed at the outer circumference of the collar 40a, and the annular engaging protrusion 42 is forcibly fitted to the reinforcing body 34. In this case, the reinforcing member 40 may be mounted to the reinforcing body 34 in advance at a stage before insert molding the sound-absorbing main body 33 on the reinforcing body 34, or, after insert molding the sound-absorbing main body 33 on the reinforcing body 34, a part of the sound-absorbing main body 33 may be compressed and deformed to forcibly fit the reinforcing member 40 to the reinforcing body 34.

(4). Summary

This embodiment has the above configuration, and since a wide range of the front surface of the engine is covered by the cover 30, members such as the crank pulley 9 and the auxiliary drive belts 10 and 11 are protected from foreign objects (e.g., flying stones), rain, or snow. Further, since the cover 30 as a whole is composed of the sound-absorbing main body 33 made of hard urethane, it is possible to significantly suppress noise caused by rotation of the crank pulley 9 and revolution of the auxiliary drive belts 10 and 11 from being transmitted to outside and inside of the vehicle. In the case where a disc for a rotation sensor is arranged at the front of the chain cover 8, such a disc may also be protected by the cover 30. Protection of timing marks for inspecting synchronization between a camshaft and the crankshaft 1 is also provided.

Further, since the cover 30 is in the form of a tray shape, the cover 30 exhibits high resistance to bending and twisting. Because the band-shaped reinforcing body 34 with a suitable width serves as a core material, combined with the form of the tray shape with the wall part 32, the robustness can be significantly improved. In this case, since most of the reinforcing body 34 is located on the front surface of the sound-absorbing main body 33, the sound-absorbing performance of the sound-absorbing main body 33 is not hindered by the reinforcing body 34. That is, it is possible to improve the rigidity of the cover 30 without hindering the sound-absorbing performance of the sound-absorbing main body 33.

Furthermore, the hard urethane constituting the sound-absorbing main body 33 has lower strength in bending and shearing compared to a hard synthetic resin and a metal plate. Thus, if the sound-absorbing main body 33 is directly fixed with the bolts 39, it would be required to fix at an extremely large number of spots to secure the required tightening strength. However, in this embodiment, since the fastening parts 35 to 38 are formed at the reinforcing body 34, no load is applied to the sound-absorbing main body 33, and a high attaching strength can be maintained.

In this case, since each of the reinforcing members 40 has the collar 40a, while the sound-absorbing main body 33 is spread to the fastening parts 35 to 38, it is possible to prevent the axial force of the bolt 39 from acting on the sound-absorbing main body 33. Also, since each of the reinforcing members 40 has the washer part 40b, it is possible to prevent the axial force of the bolt from directly acting on the reinforcing body 34, and it is thus possible to prevent stress concentration at the sound-absorbing main body 33 and the reinforcing body 34.

Thus, although there are only four fastening parts 35 to 38 at four spots, even if a load acts on the fastening parts 35 to 38 due to vibration of the cover 30, breaking of the sound-absorbing main body 33 and breaking of the reinforcing body 34 do not occur, and high attaching strength and durability can be secured.

If the reinforcing body 34 is formed in a cross shape as in the embodiment and the fastening parts 35 to 38 are provided at its tip parts, each vertex part of the diamond shape is fastened, so that a high fastening strength can be secured while minimizing the fastening parts 35 to 38. Furthermore, since the reinforcing body 34 has a band shape and the sound-absorbing main body 33 is joined to the reinforcing body 34 over a wide area, even if the cover 30 vibrates, issues such as peeling of the sound-absorbing main body 33 would not occur.

The cover 30 of this embodiment may also be used in combination with an undercover as of Patent Document 1 and Patent Document 2. However, covering only the front surface of the engine with the cover 30 of this embodiment has an advantage of preventing heat build-up below the engine.

Although the embodiments of the disclosure have been described above, the disclosure may be embodied in various other forms. For example, the shape of the cover may be changed as appropriate according to the specifications of the engine. The engine as the application target is not limited to a slant type, but may also be an inline longitudinal engine with the cylinder bore axis generally in a vertical posture, and a longitudinal V-type engine. It is also possible to fasten a part of the cover to the cylinder block or the cylinder head.

It is also possible to constitute the sound-absorbing main body by an inorganic material such as glass wool and adhere the sound-absorbing main body to a shell body made of resin or the like. Non-woven fabrics of inorganic materials may also be used as the sound-absorbing material. As the rod-shaped fastener, not only a bolt but a drive rivet may also be used. In addition to synthetic resin and a metal plate, the reinforcing body may also be a woven or knitted fabric made of fiber such as carbon fiber that is solidified into a sheet form. A composite material mixing talc in synthetic resin may also be used.

In the embodiment, the fastening part is formed in a flange shape, but it is also possible to form the fastening part in a cylindrical boss shape and arrange the fastening part on the inner side of the outer circumference of the cover. In this case, it is possible to mount a collar made of metal or the like to the cylindrical boss part to prevent buckling.

The disclosure may be embodied as a cover for an automobile engine. Thus, it may be applied industrially.

What is claimed is:

1. A cover for an automobile engine, which is a cover that covers a crank pulley and an auxiliary drive belt of an engine arranged in an engine room with the crank pulley and the auxiliary drive belt being in a posture facing a front direction of a vehicle body, the cover comprising:
    a reinforcing body that comprises a fastening part attaching to the engine and is integrated with a sound-absorbing main body, wherein
    the reinforcing body is formed in a cross shape as a whole comprising a longitudinally-long part that is long in a cylinder bore axis direction as viewed from a crank axis direction and a laterally-long part that is long in a direction crossing the cylinder bore axis direction as viewed from the crank axis direction, and the fastening part is provided at both ends of the longitudinally-long part and both ends of the laterally-long part of the reinforcing body.

2. The cover for an automobile engine according to claim 1, wherein
    the fastening part is provided with a collar in a cylindrical shape, the collar receiving a pressing force of a bolt or another rod-shaped fastener and penetrating through the reinforcing body.

3. The cover for an automobile engine according to claim 1, wherein
    the sound-absorbing main body forms a tray shape that is opened toward the engine as a whole and is composed of hard urethane with a thickness of several millimeters to less than 20 millimeters.

4. The cover for an automobile engine according to claim 1, wherein
    the sound-absorbing main body forms a tray shape that is opened toward the engine as a whole with an outer circumferential part serving as a wall part, and the reinforcing body is also arranged at the wall part of the sound-absorbing main body.

* * * * *